United States Patent [19]
Mehnert

[11] Patent Number: 5,478,287
[45] Date of Patent: Dec. 26, 1995

[54] DRIVE MECHANISM, IN PARTICULAR FOR MOTOR VEHICLES

[76] Inventor: Günter Mehnert, Sandhauser Strasse 43b, D-1000 Berlin 27, Germany

[21] Appl. No.: 47,283

[22] Filed: Apr. 19, 1993

[30] Foreign Application Priority Data

Apr. 24, 1992 [DE] Germany .............. 42 14 635.6

[51] Int. Cl.$^6$ .................... B60K 41/04; F16H 47/08; F02D 23/00
[52] U.S. Cl. ................ 475/102; 475/72; 475/93
[58] Field of Search ............... 475/72, 93, 102, 475/104, 107

[56] References Cited

U.S. PATENT DOCUMENTS

| | | | |
|---|---|---|---|
| 2,457,385 | 12/1948 | Lewit | 475/102 |
| 2,469,779 | 5/1949 | Nowalk | 475/102 |
| 2,772,583 | 12/1956 | Harbaugh | 475/102 |
| 2,890,604 | 6/1959 | Campbell, Jr. | 475/102 |
| 2,958,405 | 11/1960 | Glamani | 475/102 |
| 2,973,669 | 3/1961 | Quigley | 475/102 |
| 3,079,813 | 3/1963 | Quigley | 475/102 |
| 3,240,083 | 3/1966 | Stoddard | 475/102 |
| 3,893,352 | 7/1974 | Cotton | 475/102 |
| 4,994,002 | 2/1991 | Valotto et al. | 475/72 |

FOREIGN PATENT DOCUMENTS

| | | |
|---|---|---|
| 3611171 | 7/1987 | Germany . |
| 3720236 | 12/1988 | Germany . |
| 4032851 | 10/1991 | Germany . |

*Primary Examiner*—Dirk Wright
*Attorney, Agent, or Firm*—Birch, Stewart, Kolasch, & Birch

[57] ABSTRACT

A drive mechanism, in particular for motor vehicles having a combustion engine including at least one compressor of the displacement type integrated by way of members of a planetary gear drive into the transmission train, and which by means of valves can be regulated infinitely variably and which on the suction side serves for cooling the installation and on the motor side for supplying charging air and on the power take-off side serves to increase the rate of rotation. The reaction force of the compressor is transmitted to the planetary wheels of a gear assembly driven with down gearing and there counteracts the deviation movement, i.e. the pivoting of the planetary gears when under load. A differential gear mechanism between the gear assembly on the one hand and the compressor respectively gear casing on the other hand including two planetary gear members connected to permit a gear ratio range from idling up to 1:1. In this context, a torque amplification is attained by tangential support against the gear casing. Optionally a further compressor can be added to provide a pneumatically acting retarder, a reverse drive of the power take-off shaft or an additional amplification of the power take-off torque in an aerostatic manner.

8 Claims, 2 Drawing Sheets

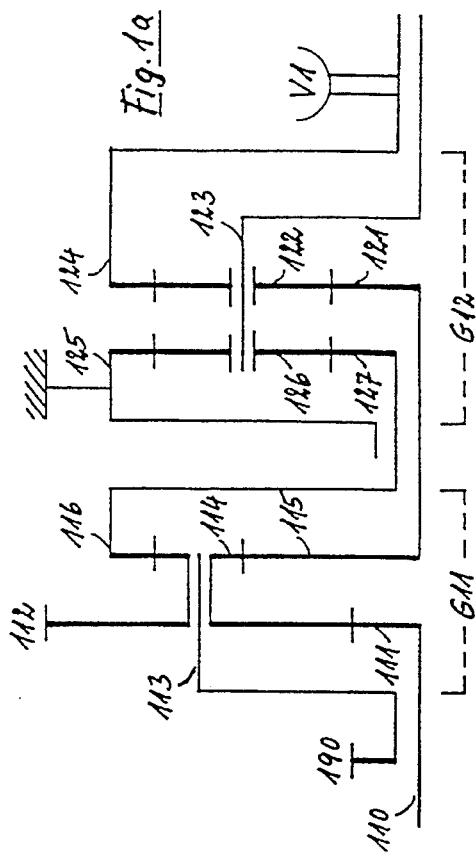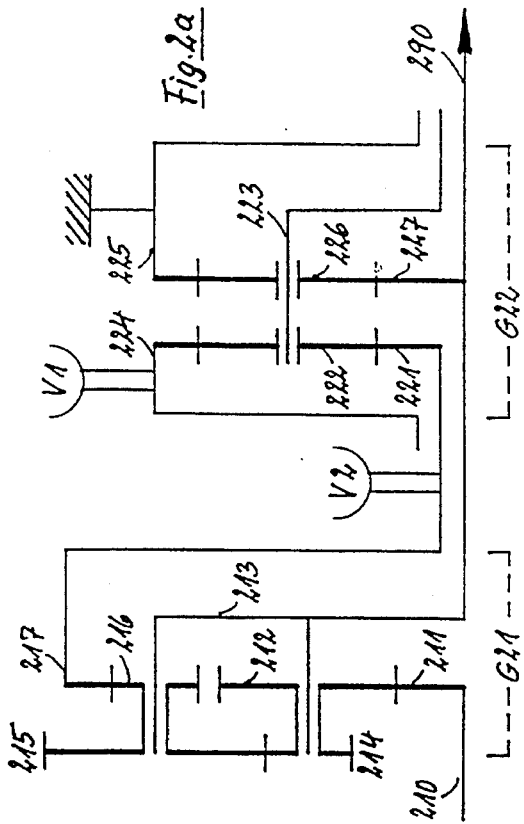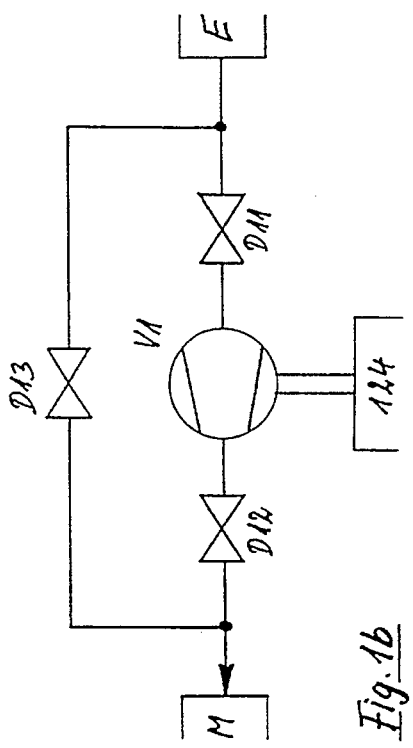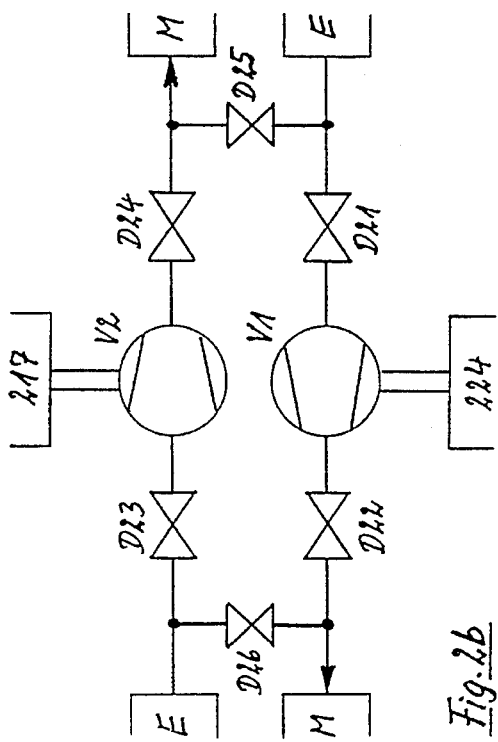

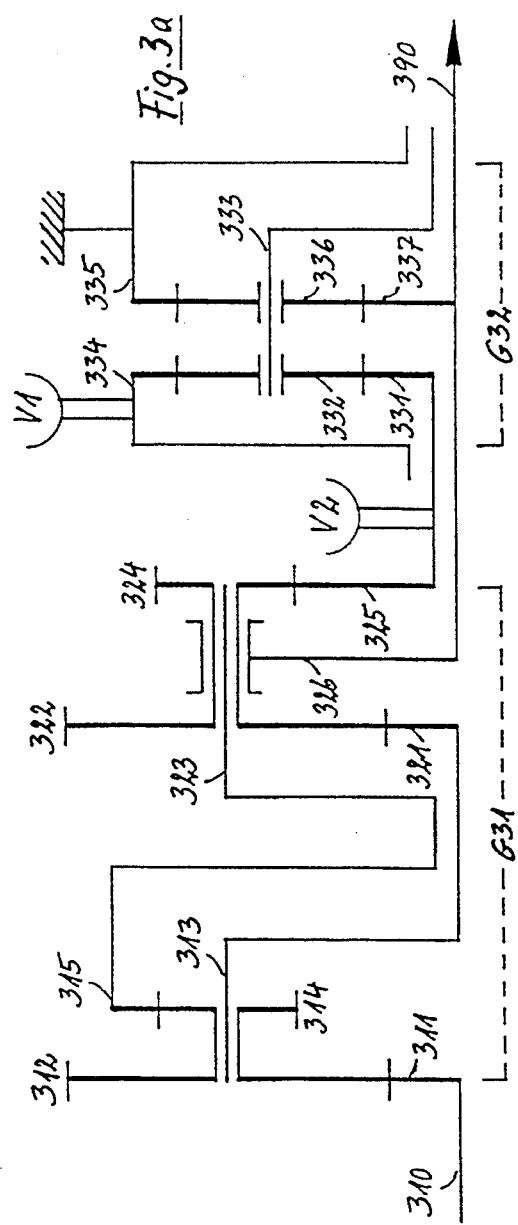
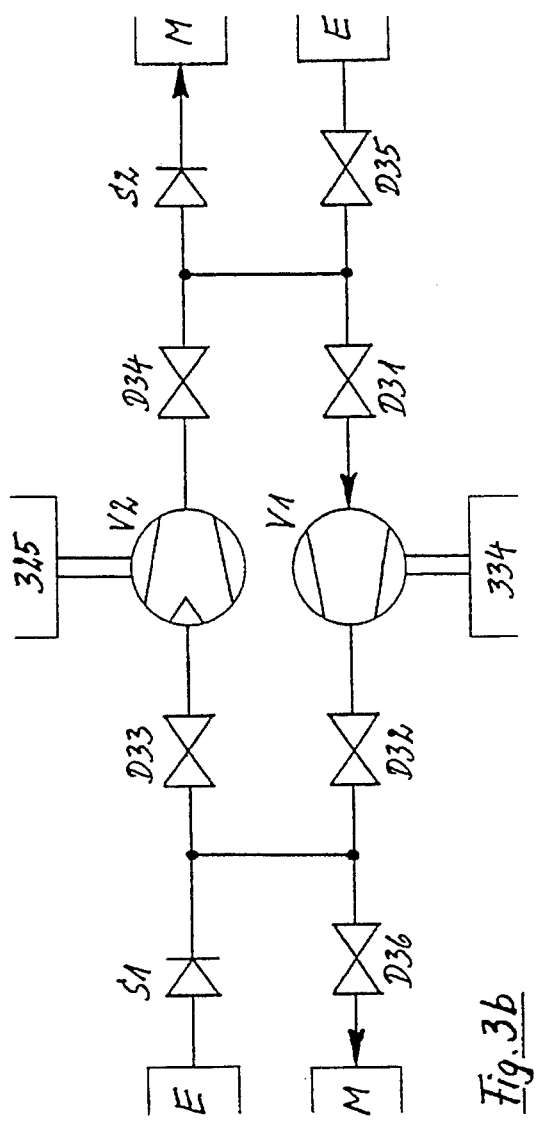

DRIVE MECHANISM, IN PARTICULAR FOR MOTOR VEHICLES

BACKGROUND OF THE INVENTION

1. Field of the Invention

The present invention relates to a drive mechanism, in particular for motor vehicles comprising a combustion engine including at least one compressor of the displacement type integrated by way of members of a planetary gear drive into the transmission train, and which by means of valves can be controlled and regulated, which on the suction side serves for cooling the installation and on the motor side for recharging the motor and on the power take-off side serves to increase the rate of rotation of the gearbox output side and which is provided with control and regulating means for adjusting and maintaining predeterminable operating conditions.

2. Description of Related Art

Such mechanisms in which air pressure differences are employed as a means for power transmission and in which the motor, charger and gearbox are so integrated that their effects are mutually supplementary are known. For example, in DE-PS 36 11 171 a drive mechanism is described which is kept thermally stable by expansion of an air volume and the resultant heat withdrawal; the drive mechanism is thereby given an adequate load capacity. As a development of that concept a torque increase can be attained by means of downstream sets of planetary wheels, and this may be combined with free-wheel elements; however, the increase can only be attained stepwise.

In DE-PS 37 20 236 a construction is described which provides for an infinitely variable torque increase by means of rotatably arranged compressors. Rotatably arranged compressors, however, are subject to high revolving masses and cause a corresponding loading of the weight supporting bearings. In addition, further structural complexities are necessary for conducting the compressed respectively expanded air volumes in order to attain the desired effect without limitations as compared with the stationary transmission casing.

Both constructions require a separate reversal gear mechanism and presuppose conventional brake installations for the power take-off shaft.

From DE-PS 40 32 851 a continuously adjustable torque amplification is known which comprises an aerostatic coupling of a plurality of compressors. This torque amplification, in spite of low mechanical expenditure, provides all driving functions—including that of a retarder and a reversal drive mechanism—and can be realized in a homogeneous manner albeit at the expense of a relatively high aerodynamic and control mechanical input.

SUMMARY OF THE INVENTION

Accordingly it is an object of the present invention to provide a drive mechanism of the aforesaid type, the power transmission of which includes an infinitely variable torque increase, combined with a transmission ratio range up to at least a ratio of 1:1, wherein only one compressor coacts as a reaction means, having a casing fixed to the transmission casing.

According to the invention this object is attained in that the gear drive comprises a reduction gear group having at least one gear assembly, preferably with stepped planetary gears, an input on the motor side and the sun wheel serving as output to the power take-off shaft of the gear mechanism and a differential gear assembly in which coact two planetary gear assemblies combined in pincer (scissor) fashion, that one central wheel each is coupled to planetary wheels of the gear assembly respectively at the flange thereof, independent rotation of these planetary wheels being maintained proportionally to a difference in rates of rotation of the two centrally mounted wheels, that two further gear members are kept at a constant ratio of rates of rotation, that the remaining gear members are tangentially supported against the casing, at least one of the gear members being supported against the casing by way of a first compressor fixed to the gear case, the input/output shaft of the first compressor being designed to retransmit the drive power at a rate of rotation which is continuously adjustable and a throttling of the rate of rotation of the compressor reducing the variable rate of rotation differences between the individual members of the differential gear mechanism in a pairwise manner.

The invention is based on the principle of convening the pivoting movements of the revolving planetary wheels of the gear assembly into a rate of rotation difference between two centrally mounted wheels and two maintain this difference pneumomechanically reducible such that the pivoting of the planetary wheels by means of a special differential gear mechanism and a compressor having a stationary casing involve tangential support in relation to the transmission casing.

In this context the differential gear mechanism converts both equal as well as different and at times oppositely directed angular velocities of the two central wheels into a proportional rate of rotation of the input/output shaft of the compressor and visa versa—i.e. into a rate of rotation which except for a construction—dependent factor is unambiguously determined by the difference of the angular velocities.

For example, when idling at maximum pivoting rate of the planetary wheels the compressor rate of rotation is at maximum. When the compressor shaft stops, the inherent rotation of the planetary wheels ceases and the transmission ratio for direct transmission for the power take-off shaft is 1:1.

The adjustment for the transmission ratio under load in each case proceeds continuously by throttling of the output volume of the compressor (V1), preferably by means of throttling valves.

Advantages of the invention as compared with the known constructions particularly include (1) a continuously adjustable torque amplification based on tangential support against the transmission casing by way of a compressor serving as the reaction means, the casing of which is firmly connected to the transmission casing; 2) combined with a high proportion of conventional mechanics without brakes, clutches, free-wheel components, etc. combined with a pneumatic component in which merely a feed flow adapted to be throttled and a ratio between the excess pressure and reduced pressure need to be regulated and thus; 3) a comparatively low development expenditure for a drive mechanism which has all the advantages and consequential advantages of an infinitely variable transmission and which is also suitable for high loads.

The function scope and field of application of a drive mechanism according to the invention may be advantageously expanded according to the eharacterising features of the appended claims.

An expansion of the down gearing component by further preceding gear assemblies increases the effective leverage advantage which acts from the crankshaft onto the differential gear mechanism and thereby increases the maximum transmittable torque. This may, for example, be utilized during the starting phase of the vehicle or at high loads in comparison to the engine capacity. The additionally introduced gear assemblies are coupled to the power take-off shaft so that at a transmission ratio of 1:1 they revolve like a single shaft.

A pneumatically acting retarder with a jolt-free transition to reverse drive of the power take-off shaft extends the drive functions in a homogeneous manner. The second compressor used herefor moreover makes available additional charging air, in particular when the feed volume of the first compressor is throttled.

Additional amplification of the drive torque may be attained, in particular during the starting up phase of the vehicle, if the conveyance lines of the first and the second compressor are so interconnected by way of air chambers that the second compressor absorbs the pressure energy of the first compressor and during that phase acts as a pneumatic motor in the drive mechanism. Blocking valves will then take care of an automatic switching off of the aerostatic component in the upper transmission range.

The construction and design of the drive mechanism according to the invention can be substantially adapted to prevailing requirements so that an application both for relatively weak drive torques as well as for respectively high load requirements is possible.

Ever since the coming about of combustion engines there has been a demand for infinitely variable gear mechanisms which are as simple as possible and at the same time can be loaded as highly as possible, and this requirement increases with rising traffic densities and the associated external limitations, more particularly to the same extent as the engine rate of rotation of conventional drive systems continue deviating from whatever is the most advantageous value.

The invention is illustrated in the accompanying sketches. With reference to FIGS. 1a–3b the mode of functioning of three working examples of the invention— having different scopes of function—will be further explained in the following.

BRIEF DESCRIPTION OF THE DRAWINGS

There is shown in:

FIG. 1a the schematic transmission plan for an embodiment (1) comprising a simple down gearing group G11, a differential gear assembly G12 and the connection to a compressor V1, drive: from the crankshaft 110, power take-off: to the central wheel 190
only forward;

FIG. 1b the pneumatic arrangement for an embodiment (1) with the compressor V1 and the mechanical connection to the differential gear mechanism G12, Input: from outside (E),
Output: to the motor (M).

FIG. 2a the schematic transmission plan for an embodiment (2), comprising a radially staggered gearing down assembly G21, a differential gear mechanism G22 and the connections to the compressors V1 and V2, drive: from the crankshaft 210, power take-off: to the shaft 290
forward and backwards;

FIG. 2b the pneumatic arrangement for an embodiment (2), including the compressors V1 and V2 and the connections to the differential transmission G22, respectively to the gearing down assembly G21, input: from outside (E),
output: to the motor (M);

FIG. 3a the schematic transmission plan for an embodiment (3), comprising a coaxially staggered gearing down assembly G31 a differential gear assembly G32 and the connections to the compressors V1 and V2 input: from the crankshaft 310, output: to the shaft 390, forwardly and backwardly, partly with aerostatic amplification; and FIG. 3b the pneumatic assembly for an embodiment (3), comprising the compressors V1 and V2 and the connections to the differential gear mechanism G32 respectively to the gearing down assembly G31, input: from outside (E) respectively from the respectively other compressor, output: to the motor (M), respectively to the respectively other compressor.

DETAILED DESCRIPTION OF PREFERRED EMBODIMENTS

In the working example (1) as schematically illustrated in FIGS. 1a and 1b, the propulsion proceeds from the crankshaft 110 by way of the central wheel 111 of a transmission assembly and is applied onto stepped planetary wheels 112 and 114. The load is applied to a power take-off wheel 190 which is fitted on a planet wheel flange 113. The brake effect resulting therefrom initially leads to a deviatory movement in the form of a rotation of the planetary wheels 112 and 114 as such.

Centrally mounted wheels 115 designed as spur wheels and the wheels 116 designed as hollow wheels, intermesh with the planetary wheels 114 and thereby convert the pivoting of the planetary wheels 112 and 114 into a rate of rotation difference on the main shaft of the gearbox. On the other hand they are also coupled by way of a hollow shaft to the differential gear mechanism G12 which is essentially formed by two interconnected planetary wheel transmissions, one being activated as a gear assembly and the other as a distribution gear mechanism:

The driving force is conducted from a spur wheel 115 by way of the central wheel 121 into the differential gear mechanism and there initially results in a yielding movement of planetary wheels 122, which are coupled by way of a hollow wheel 124 to the input/output shaft of the compressor V1. The throttle valves D11, D12 as well as the return flow respectively by-pass valve D13 are initially open; by throttling the air by means of the valves D11, D12 this deviation movement is braked.

In this context, the driving force from the central wheel 121 and the resultant reaction force of the compressor V1 are collected on a double flange 123 and in this manner conducted to the output side of the differential gear mechanism where the resultant force is distributed by planetary wheels 126 to central internally geared and spur wheels 125 and 127 respectively. The internally geared wheel 125 is in fixed relationship to the transmission casing so that the spur wheel 127 is given an increased rate of rotation in relation to the flange 123 and this rate of rotation is transmitted by way of the common hollow shaft onto the hollow wheel 116.

The double flange 123 of the differential transmission, as for the remainder, freewheels so that the forces on the input side and the output side of the differential gear mechanism are enabled to transmit a tangentially directed coupling of forces onto the planetary wheels 114 to counteract the pivoting of the latter the components thereof added up in a scalar manner at appropriate loads being possibly greater than the driving force of the motor applied to the wheel 111. In this context the compressor V1 serves as a variable support member between the— geared down—drive and the transmission casing.

The bridging function of the double flange 123 on the one hand permits the supporting action during the revolving of the planetary wheels to be maintained, and on the other hand an overall transmission ratio of 1:1 can thereby be attained.

When idling, the pivoting rate of the planetary wheels 112 and 114 is at a maximum. To the extent that this is reduced by throttling of the supply flow in V1, the rate of rotation of the drive shaft increases. However, this also causes a reduction of the down gearing ratio: The proportion of the drive component back transmitted by way of the output side of the differential gear mechanisms onto the planetary wheels 112 and 114 increases and the amplification of the power take-off torque is reduced correspondingly.

For a gear ratio of 1:1 the pivoting of the planetary wheels 112 and 114 is zero and the input and output moments are of equal magnitude. In that case the gear assembly G11 revolves like a compact shaft, the spur wheels 121 and 127 of the differential gear mechanism G12 roll at the same angular velocity (over the planetary wheels 122 and 126) in relation to the stationary hollow wheels 124 and 127, and the feed output of the compressor V1 disappears.

FIGS. 2a and 2b show a working example (2) comprising an extended gearing down unit G21 and a second compressor V2.

In this case two gear assemblies, each comprising stepped planetary wheels, are connected in series in a sun wheel 213, the flow of forces from a crankshaft 210 by way of wheels 211, 212, 214, 215, 216, 217 and a hollow shaft leading to the differential gear mechanism G22, from where it passes— in analogy to the embodiment (1)—by way of the members 221, 222, 223, 226, 227 back onto a flange 230 and thereby onto a power take-off shaft 290.

In this context the sun wheel 213 directly takes up one component of the back transmitted force couple which is formed by the reaction force of the compressor V1 when its supply flow is throttled due to the valves D21, D22 while in particular the valves D23, D24 are open.

The throttle valves D23, D24 serve the purpose of throttling the supply flow of the compressor V23 when required, to thereby transmit a deceleration moment onto the hollow shaft including the hollow wheel 217 while the valves D21, D22 are now open. The brake effect resulting therefrom onto the flange 213 necessarily results in a reduction of the revolution number of the power take-off, and, if the angular velocity of 217 is adequately reduced, this results in a reversal of the direction of rotation of the flange 213 and thereby of the power take-off shaft 290.

The throttle valves D25, D26 solely serve as compensating, respectively return flow valves in analogy to D13 in the embodiment (1).

In a working example (3) schematically illustrated in FIGS. 3a and 3b, the gearing down assembly G31 comprises two coaxially mounted gear assemblies connected in series having stepped planetary wheels as well as a differential gear mechanism G32, which corresponds for example to the differential gear mechanism G22 of the embodiment (2). Apart from that, in the embodiment (3) an aerostatic coupling of the compressors V1 and V2 is provided for, which acts relatively simply and only for a portion of the transmission ratio range— consequently without being limited by the aerostatically caused compression respectively expansion slip—in the region of the transmission ratio 1:1.

The drive force is transmitted by the crankshaft 310 by way of members 311, 312, 313, 321, 322, 324, 325, 331 to the differential gear mechanism G32 and thereby attains an extended power arm on the input side as compared to a variable support member 334 in G32.

The reduction gear set G31 is connected to the power take-off shaft 390 by way of a hollow wheel 315 and a stepped sun wheel 323/326, so that for a transmission ratio of 1:1 all elements of G31 here as well revolve like a single shaft.

Retardation and reverse running of the power take-off shaft 390 are attained in a manner analogous to embodiment (2)—by throttling the compressor V2 coupled to the spur wheel 325.

If during starting of the vehicle initially only the throttle valves D35, D36 are activated, the yielding movement of the compressor V1 under load, i.e. in relation to a double flange 333 on the one hand gives rise to a feed flow which is guided onto the cross-sectional area of the compressor V2 effective for the pressure build up, and on the other hand the compressor V1 thereby sucks in air which is at least partly withdrawn from the feed flow of V2.

The strength of the aerostatically caused moment which is returned from V1 onto the compressor V2 and thereby onto the hollow shaft between 325 and 331 depends on the throttling of the valves D35 and D36. The tuning between excess pressure and reduced pressure results in the required thermal stability. During that phase, closure valves S1 and S2 prevent an undesired return flow.

When the vehicle is further accelerated, i.e. with further throttling of the feed rate of V1 and simultaneous increase of the rate of rotation of 325 and thereby of the feed rate of V2, the throttling of V1 once again proceeds by way of the valves D31, D32 as in the embodiment (2), and the stop valves S1 and S2 automatically release the air flow for the compressor V2. Throttle valves D33, D34 serve to employ the compressor V2 by way of the spur wheel 325 for the aforesaid retarder function and the reverse movement of the power take-off shaft.

Further modifications are possible within the scope of the invention. For example, the reduction gear set may be extended in principle in an optional manner by preceding gear assemblies—even without stepped planetary wheels or without hollow wheels—as a further alternative to counter-rotating shafts of a compressor in fixed relationship to the gear casing, and the rate of rotation of which is kept reciprocally to the throttling of the compressor is for example also suitable to serve as support members for the differential gear mechanism.

The coupling of the individual gear members is likewise variable, and instead of spur wheels and hollow wheels, it is for example possible to employ conical gears and baffle wheels without departing from the scope of the invention.

The contents of the certified copy of the basic application of which priority is claimed are to be treated as part of this disclosure.

The claims which follow are to be considered an integral part of the present disclosure.

I claim:

1. A drive mechanism, in particular for motor vehicles comprising,
    a combustion engine including at least one compressor of the displacement type integrated by members of a planetary gear drive into a transmission train, and which is controlled and regulated by valves, which on a suction side serves for cooling and on a motor side for recharging a motor and on a power take-off side serves to increase a rate of rotation of a gearbox output side and which is provided with control and regulating means for adjusting and maintaining predeterminable operating conditions, further comprising;

the gearbox includes a reduction gear group each having at least one gear assembly, an input on the motor side and a sun wheel serving as output to a power take-off shaft of the gearbox and a differential gear assembly which coact two planetary gear assemblies combined in pincer fashion, a centrally mounted wheel coupled to each planetary wheel of the gear assembly respectively, pivoting of each planetary wheel being maintained proportionally to a difference in rates of rotation of the centrally mounted wheels, two further gear members that are kept at a constant ratio of their rates of rotation, other gear members are tangentially supported against a casing, at least one of the gear members being supported against the casing by way of a first compressor fixed to gear members, the input/output shaft of the first compressor being designed to retransmit drive power at a rate of rotation which is continuously adjustable and a throttling of the rate of rotation of the compressor reducing the variable rate of rotation differences between the individual members of the differential gear mechanism in a pairwise manner.

2. The drive mechanism according to claim 1, wherein said reduction gear group comprises a plurality of gear assemblies connected in series to each of which one member is coupled in a fixed non-rotational manner to the power take-off shaft.

3. The drive mechanism according to claim 1, wherein a second compressor of the displacement type is integrated into the transmission train, the second compressor being continuously adjustable.

4. The drive mechanism according to claim 3, wherein the second compressor is coupled to a transmission shaft which is mechanically controlled so that its rate of rotation is always greater than or equal to the rate of rotation of the power take-off shaft and which in the event of a throttling of the second compressor transmits a deceleration moment onto the power take-off shaft and which, in the event of adequate reduction of its rate of rotation reverses the direction of rotation of the power take-off shaft.

5. The drive mechanism according to claim 3 wherein said first and second compressors are aerostatically coupled by way of an expanded and/or compressed air volume in a portion of the transmission ratio range an additional portion of the reaction force generated under load being adapted to be transmitted from the first compressor to the second compressor and from the latter to the transmission take-off.

6. The drive mechanism according to claim 1, where there are transmission members which are kept at a constant rate of rotation to one another and non-rotationally interconnected.

7. The drive mechanism according to claim 1, wherein at least one of the planetary gear assemblies comprises stepped planetary gears.

8. The drive mechanism according to claim 4, wherein said first and second compressors are aerostatically coupled by way of an expanded and/or compressed air volume in a portion of the transmission ratio range an additional portion of the reaction force generated under load being adapted to be transmitted from the first compressor to the second compressor and from the latter to the transmission take-off.

* * * * *